United States Patent [19]

Rothamel

[11] Patent Number: 5,060,513
[45] Date of Patent: Oct. 29, 1991

[54] APPARATUS FOR MEASURING UNBALANCE ON ROTARY MEMBERS

[75] Inventor: Karl Rothamel, Darmstadt, Fed. Rep. of Germany

[73] Assignee: Hofmann Werkstatt-Technik GmbH, Pfungstadt, Fed. Rep. of Germany

[21] Appl. No.: 521,379

[22] Filed: May 10, 1990

[30] Foreign Application Priority Data

Jul. 13, 1989 [DE] Fed. Rep. of Germany ....... 3923191

[51] Int. Cl.$^5$ ............................................. G01M 1/22
[52] U.S. Cl. ...................................... 73/460; 73/462; 73/475
[58] Field of Search ................. 73/460, 462, 471, 473, 73/475, 476, 479, 487

[56] References Cited

U.S. PATENT DOCUMENTS

| | | | |
|---|---|---|---|
| 4,031,760 | 6/1977 | Muller | 73/462 |
| 4,173,146 | 11/1979 | Kögler et al. | 73/462 |
| 4,177,678 | 12/1979 | Harant | 73/460 |
| 4,202,213 | 5/1980 | Toriselli | 73/487 |
| 4,300,387 | 11/1981 | Okano et al. | 73/487 |
| 4,302,975 | 12/1981 | Sugiyama et al. | 73/487 |
| 4,336,717 | 6/1982 | Goebel | 73/487 |
| 4,474,076 | 10/1984 | Lehmann | 73/458 |

FOREIGN PATENT DOCUMENTS

| | | | |
|---|---|---|---|
| 306668 | 3/1989 | European Pat. Off. | 73/460 |
| 2732738 | 8/1980 | Fed. Rep. of Germany | |
| 3730084 | 3/1989 | Fed. Rep. of Germany | |
| 132641 | 8/1983 | Japan | 73/460 |

OTHER PUBLICATIONS

Hofmann Mittenzentriervorrichtungen MZV MZV-S.
Hofmann Info 2 Messverfahren in der Auswuchtechnik, Hermann Brunnengraber, Peter Drust.

*Primary Examiner*—Tom Noland
*Assistant Examiner*—Craig Miller
*Attorney, Agent, or Firm*—Cushman, Darby & Cushman

[57] ABSTRACT

An apparatus for measuring unbalance on a rotary member such as a motor vehicle wheel comprises a drive motor for driving a main shaft carrying the rotary member, by way of a reduction transmission means having a self-locking action so that the main shaft can be braked by the self-locking action after an unbalance measuring run. The self-locking action of the reduction transmission means also serves to resist a rotary moment applied to the main shaft when tightening or loosening a clamping arrangement with which the rotary member is clamped on the main shaft, so that the main shaft remains in a stationary position during that operation.

16 Claims, 3 Drawing Sheets

APPARATUS FOR MEASURING UNBALANCE ON ROTARY MEMBERS

BACKGROUND OF THE INVENTION

A typical form of apparatus for measuring unbalance on a rotary member such as a motor vehicle wheel comprises a main shaft on which the rotary member to be balanced is clamped by means of a suitable clamping arrangement. A drive motor is provided to drive the main shaft in rotation, by way of a reduction transmission disposed between the main shaft and the motor. The apparatus also includes a restraining means for holding the main shaft when the clamping arrangement is being actuated, that is to say tightened or loosened, for fitting a rotary member on to the main shaft or for removing a rotary member therefrom. The restraining means thus holds the main shaft to resist the torque which is applied thereto in the operations of tightening or loosening the clamping arrangement for fixing the rotary member on the rotary shaft. One form of such restraining means comprises a holding brake structure, for example in the form of an electromagnetically operated brake, an example of which is to be found in German laid-open application (DE-OS) No 37 30 084. Such apparatuses are to be found for example in balancing machines in a workshop for the balancing of motor vehicle wheels.

Furthermore, after a measuring run for detecting unbalance of a rotary member has been completed, for slowing the rotary member down to bring it to a stop, when the drive motor is in the form of a three-phase motor, the rotary field of the drive motor may be reversed to produce the deceleration effect. For the purposes of positioning the rotary member on which unbalance has been measured, to put it into the appropriate position for balancing thereof, use is made of a pulsating direct current which is supplied to the windings of the three-phase drive motor.

In that situation however, particularly when decelerating the rotary member to bring it to a halt after a measuring run has been carried out thereon, undesirable braking moment peaks may occur, which result in the rotary member being turned on the main shaft as the rotary member is fixed on the main shaft in the appropriate angular relationship therewith by the clamping arrangement, by means of a frictional engagement effect. If however, undesirable braking moment peaks result in the rotary member being turned relative to the main shaft, it is no longer possible to provide for a precise association as between the angular position of the detected and measured unbalance and a balancing position in which unbalance of the rotary member is to be removed, for example by fitting a balancing weight to the rotary member.

SUMMARY OF THE INVENTION

An object of the present invention is therefore to provide an apparatus for measuring unbalance on a rotary member, which operates in a more reliable fashion, thus giving a more satisfactory measurement result.

Another object of the present invention is to provide an apparatus for measuring unbalance on a rotary member, which is capable of providing for retention of the rotary shaft thereof when fitting and removing a rotary member while also affording deceleration of the rotary member after a measuring run, in a smooth manner without substantial torque peaks.

Still another object of the present invention is to provide a rotary member unbalance measuring apparatus which is simple both in terms of its design configuration and its mode of operation.

In accordance with the present invention, these and other objects are attained in an apparatus for measuring unbalance on a rotary member such as a motor vehicle wheel, comprising a main shaft on which a rotary member to be balanced can be clamped by means of a clamping arrangement, with a drive motor for driving the main shaft at a measuring speed of rotation. A transmission means is disposed between the main shaft and the motor and is in the form of a self-locking reduction transmission means. The holding force produced by the self-locking action of the reduction transmission means, which is thereby applied to the main shaft, is greater than a rotary moment or torque acting on the main shaft when the clamping arrangement for holding a rotary member on the shaft is being actuated, for example tightened or loosened.

Thus, as will be seen in greater detail hereinafter in relation to a specific embodiment, when the drive motor of the apparatus is switched off after an unbalance measuring run has been carried out, the rotary member is decelerated in such a fashion as to be substantially devoid of any torque peaks during the deceleration mode, by virtue of the self-locking action of the reduction transmission means, but in addition the reduction transmission means acts as a restraining means to resist the torques applied to the main shaft when tightening or loosening the rotary member on the main shaft.

In accordance with a preferred feature of the invention the apparatus also includes a rotary moment or torque monitoring circuit means for detecting a rotary moment applied to the main shaft, which circuit means, at a detected rotary moment, switches on the drive motor to overcome the self-locking effect of the reduction transmission means. The rotary moment applied to the main shaft, the detection of which causes the drive motor to be switched on, may be applied to the main shaft for example by an operator, by virtue of the operator turning the rotary member. That can assist with turning the rotary member into the appropriate angular position for effecting balancing thereof, for example by fitting a balancing wheel thereto. Thus, as soon as the rotary member has been moved into the appropriate balancing position, the rotary moment monitoring circuit means can be cut out of operation by means of a switch such as a foot-operated switch, so that the rotary member is then no longer driven in rotation by the drive motor but is secured in the appropriate balancing position by the reduction transmission means again applying its self-locking effect to the rotary member.

In a further preferred feature of the invention, the monitoring circuit means for monitoring when a rotary moment is applied to the rotary member from the outside of the apparatus, for example by an operator, may include first and second sensors which are arranged at respective sides of the main shaft and which are connected to a difference forming means for actuating a switching device for supplying power to the drive motor. The sensors may preferably be in the form of force measuring means. It is advantageously also possible to use for that purpose the sensors which are employed in a measuring run for measuring unbalance of a rotary member. Reference may be made for example to German patent specification No 2 732 738 concerning an unbalance measuring apparatus in which measurement value pick-ups, in particular force measurement transducers, are arranged in such a way that two pick-ups are disposed in a first plane and a pick-up is disposed in a second measuring plane. If the principles of the present invention are used in an unbalance measuring apparatus of that kind, the two measurement value pick-ups disposed in the first plane are also employed for detecting the rotary moment applied to the main shaft. As indicated above the output signal of the difference forming means to which the first and second sensors are connected controls a switching device by way of which the drive motor can be connected to its power supply, thereby to overcome the self-locking effect of the reduction transmission means. When that happens, the drive motor is driven in rotation in dependence on the direction of the rotary moment applied to the main shaft for turning the rotary member into the appropriate desired position.

Preferably the reduction transmission means has a high step-down or reduction ratio as between the motor and the main shaft, which contributes to the self-locking effect upon a reversal in the force flux acting in the apparatus. The reduction ratio may be for example up to 1/50 or greater. That also makes it possible to use a servo motor with a relatively low power output, for example 100 to 200 watts.

In order to provide overload protection as between the reduction transmission means and the main shaft, a suitable overload protection means for example in the form of a coupling means such as a slipping clutch is operatively disposed between the reduction transmission means and the main shaft or the motor shaft and the transmission means. The overload protection coupling establishes a maximum transmissible torque so that the transmission means is thereby protected from severe overloading.

In accordance with further preferred features the reduction transmission means may be in the form of a planetary transmission means or a gear-type transmission means with crossed axes.

Further objects, features and advantages of the present invention will be apparent from the following description of preferred embodiments of the invention.

DESCRIPTION OF PREFERRED EMBODIMENTS

Figure 1:
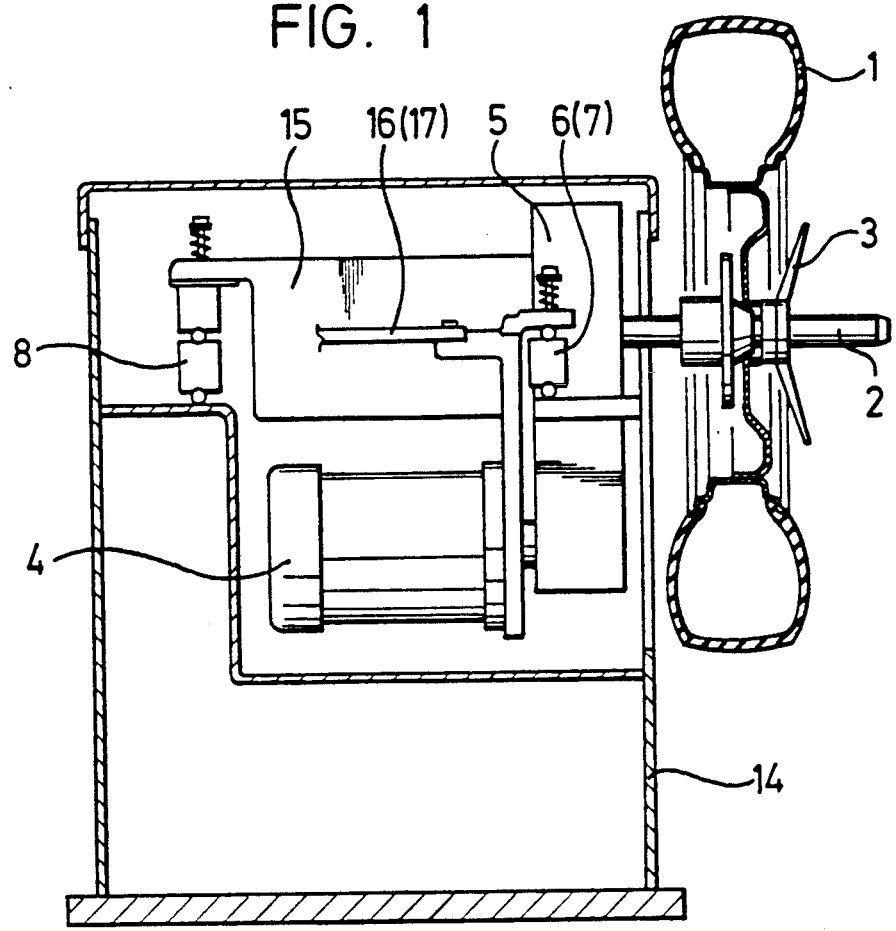
FIG. 1 is a general diagrammatic view of a balancing machine incorporating an apparatus in accordance with the principles of the present invention.
Figure 2:
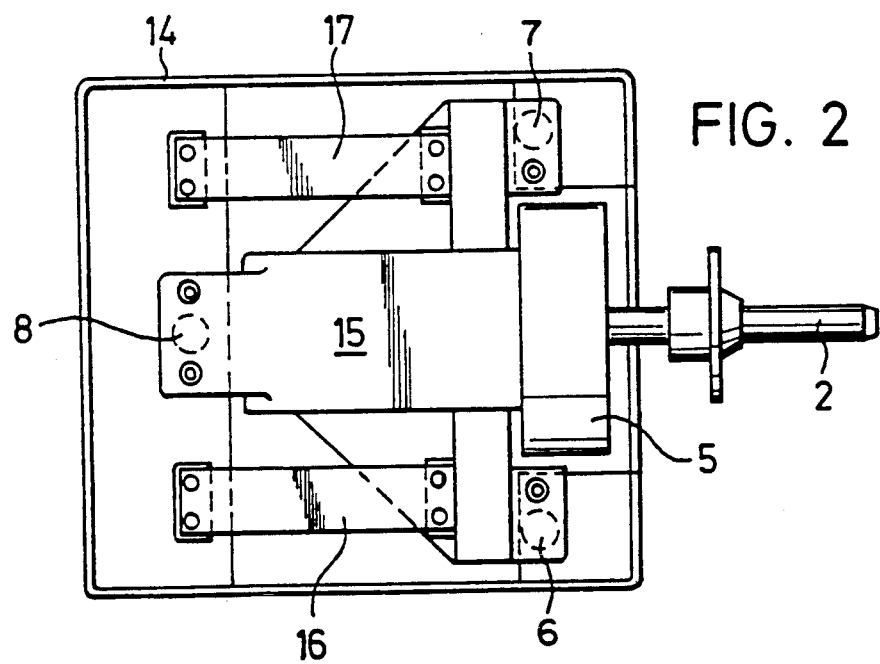
FIG. 2 is a plan view of the FIG. 1 machine, illustrating the arrangement of measurement value pick-ups.

Referring firstly to FIGS. 1 and 2, illustrated therein is a balancing machine for balancing rotary members in the form of motor vehicle wheels as indicated generally at 1, comprising a machine housing in which an apparatus for measuring unbalance of the motor vehicle wheel is disposed. The unbalance measuring apparatus has a mounting shaft 2 on which a rotary member or wheel 1 to be balanced can be clamped in a centered condition by means of a clamping arrangement generally indicated at 3. Clamping arrangements of that kind are known, as shown for example in the company publication 'Hofmann-Mittenzentriervorrichtungen MZV, MZV-S8', Imprint 940270204.86 D. The rotary member 1 or motor vehicle wheel is suitably fixed on the main shaft 2 by means of the clamping arrangement 3 which also acts as a centering device.

With the motor vehicle wheel 1 clamped on the main shaft 2, the main shaft 2 is driven in rotation during an unbalance measuring run by a drive motor 4 which can preferably be in the form of a commutator-less dc motor or an asynchronous motor. Operatively connected between the motor 4 and the main shaft 2 is a transmission means diagrammatically indicated at 5, which is in the form of a self-locking reduction transmission means. An embodiment of a reduction transmission means of that nature is shown in FIG. 3 to which reference will be made hereinafter.

The unbalance forces which occur during the measuring run, arising out of unbalance of the rotary member or motor vehicle wheel 1 which is driven in rotation on the main shaft 2, are measured by means of measurement value pick-ups indicated at 6, 7 and 8 in FIG. 2. The pick-ups 6, 7, and 8 are preferably in the form of force measurement transducers. As can be clearly seen from FIG. 2, first and second measurement value pick-ups 6 and 7 are arranged in a measuring plane, at respective sides of the main shaft 2, while the third pick-up 8 is disposed in a second measuring plane, at a central position rearwardly of the main shaft 2, that is to say, to the left of the main shaft 2 in FIG. 2. That measurement value pick-up configuration is to be found in German patent specification No. 2 732 738 to which suitable reference may be made for further information thereon.

Referring still to FIGS. 1 and 2, the main shaft 2 is mounted in a mounting member 15 which is suitably supported on the housing of the machine, which is indicated at 14 in FIG. 2, by way of suitable support elements which in the illustrated embodiment are in the form of leaf springs 16 and 17. In the illustrated embodiment the mounting member 15 is further supported on the housing 14 of the machine by way of the measurement value pick-ups 6, 7 and 8.

Figure 3:
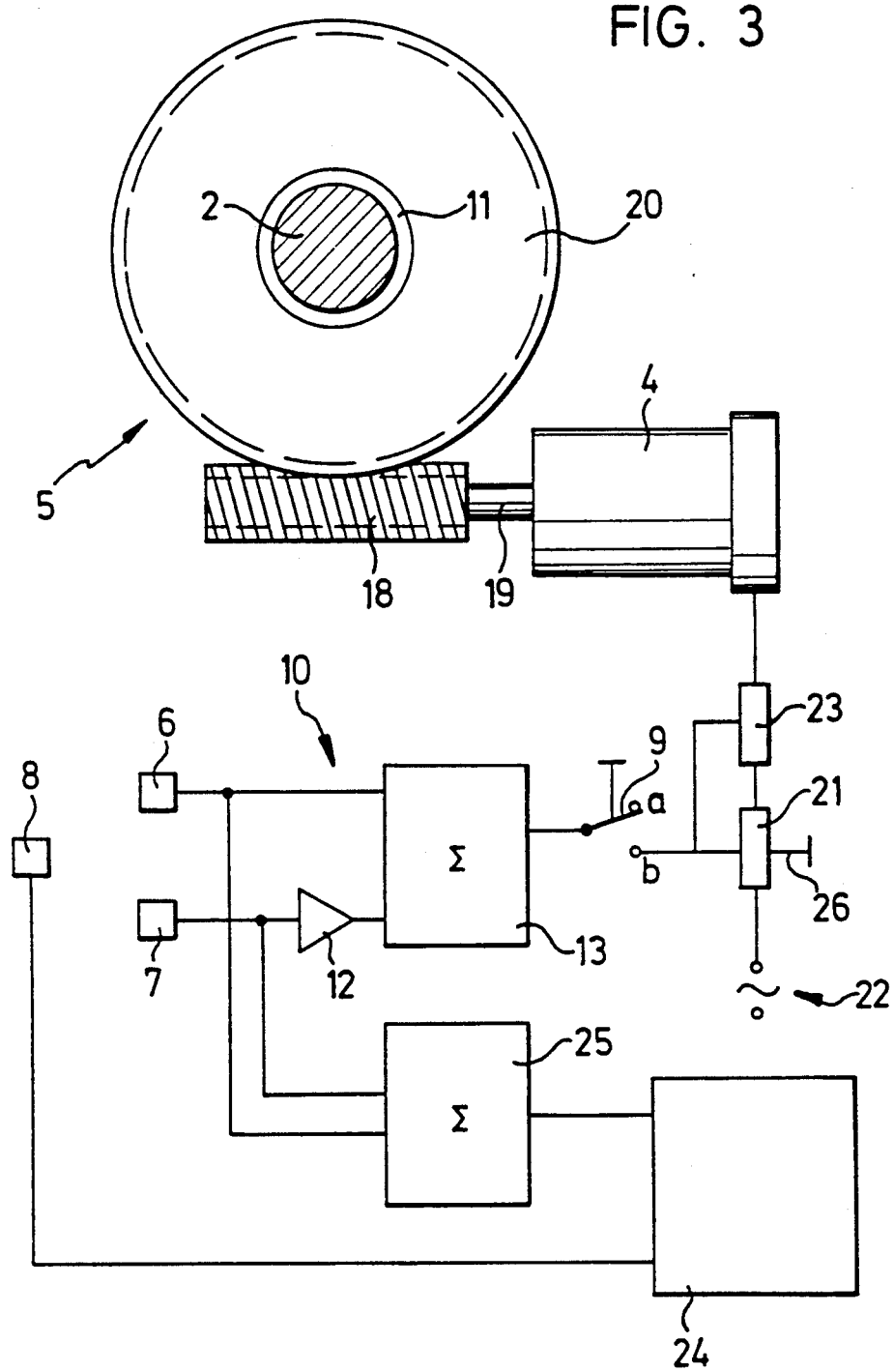
FIG. 3 shows an embodiment of a reduction transmission means which can be used in the apparatus in accordance with the invention, together with a block circuit diagram illustrating a rotary moment torque monitoring circuit.

Referring now to FIG. 3, shown therein is an embodiment of the self-locking reduction transmission means 5 in the form of a gear-type transmission means with crossed axes in respect of the transmission gears. Thus, a worm 18 is secured to a motor shaft 19 of the drive motor 4 and meshes with a worm gear 20 which is fixed on the main shaft 2. Reference numeral 11 in FIG. 3 diagrammatically indicates a means for affording overload protection for the arrangement, in the form of a coupling such as a slipping clutch which is operatively disposed between the worm gear 20 and the main shaft 2, in order to prevent the transmission means from being subjected to a substantial torque overloading. Instead of the worm gear assembly described above, it is also possible to use a pair of helical gears to constitute the transmission means 5 with its self-locking or irreversibility effect.

In order to be able to overcome the self-locking action of the reduction transmission means 5, for example for turning a motor vehicle wheel to be balanced into an appropriate angular position for carrying out a balancing operation, by virtue of manual positioning of the motor vehicle wheel, the two measurement value pick-ups 6 and 7 which are arranged in one measurement plane at respective sides of the main shaft 2 may serve as sensors of a rotary moment monitoring circuit as indicated generally at reference 10 in FIG. 3. If for example the operator of the machine manually turns a motor vehicle wheel which has come to a halt after an unbalance measuring run, a rotary moment is applied to the main shaft 2 and that rotary moment is detected by way of the two pick-ups 6 and 7 which thus serve as sensors in that respect. Corresponding output signals from the pick-ups 6 and 7 are then passed to a difference forming means comprising an inverter 12 and a summing means 13. For that purpose, the output signal from the pick-up 6 is applied directly to the summing means 13 while the output signal from the pick-up 7 is applied to the inverter 12 and from there to the summing means 13. The output signal produced by the summing means 13 actuates a switching device indicated at 21, which is operable to connect the motor 4 to a power supply source 22. The power supply source 22 is the same power supply source as that which is used to drive the drive motor 4 when carrying out an unbalance measuring run.

The drive motor 4 is supplied with power by way of the electronic control assembly as indicated at 23, which is associated with the drive motor, and the drive moment of the drive motor 4 overcomes the self-locking effect of the reduction transmission means 5. As the output signal of the summing means 13 is also applied with the appropriate sign to the electronic control assembly 23, drive to the rotary member to be balanced is effected in dependence on the direction of the torque applied to the main shaft 2 by the operator, to cause the rotary member to be turned in the desired direction.

Reference numeral 9 in FIG. 3 indicates a switch which may be for example a foot-operated switch and by means of which the above-described control circuit for overcoming the self-locking action of the reduction transmission means can be interrupted again. That can be achieved by putting the switch 9 into the position shown in FIG. 3, in which the switch is open with its movable contact member at position a. In position b of the contact member of the switch 9, the switch 9 is closed so as to bring the control circuit into operation to overcome the self-locking action of the reduction transmission means 5. In that way the motor vehicle wheel 1 to be balanced can be manually moved into the desired angular position for effecting balancing thereof and can then be restrained in that position under the restored self-locking effect of the reduction transmission means, in order to carry out a balancing operation.

During an unbalance measuring run, the measurement value pick-ups 6, 7 and 8 serve to detect the forces produced in the first and second measurement planes containing the pick-ups 6, 7 and pick-up 8 respectively, due to the unbalance of the rotary member or wheel 1. The signals which are produced as a result are passed to an electronic evaluation assembly 24 for measuring the unbalance of the rotary member or wheel. For that purpose the signals from the first and second measurement value pick-ups 6 and 7 in the one measurement plane are passed to the evaluation assembly 24 by way of a summing circuit 25 and the measurement signals from the other pick-up 8 in the other measurement plane are passed directly to the electronic evaluation assembly 24.

Suitable electronic evaluation assemblies are to be found for example in Hofmann-Info 2 'Messverfahren in der Auswuchttechnik' (Imprint 05.88) to which suitable reference may accordingly be made for further information thereon.

For initiating a measuring run, the switching device 21 can also be moved into an on position by an actuating button 26 disposed at a suitable location on the balancing machine, with the result that the drive motor 4 is supplied with power from the power supply source 22.

Figure 4:
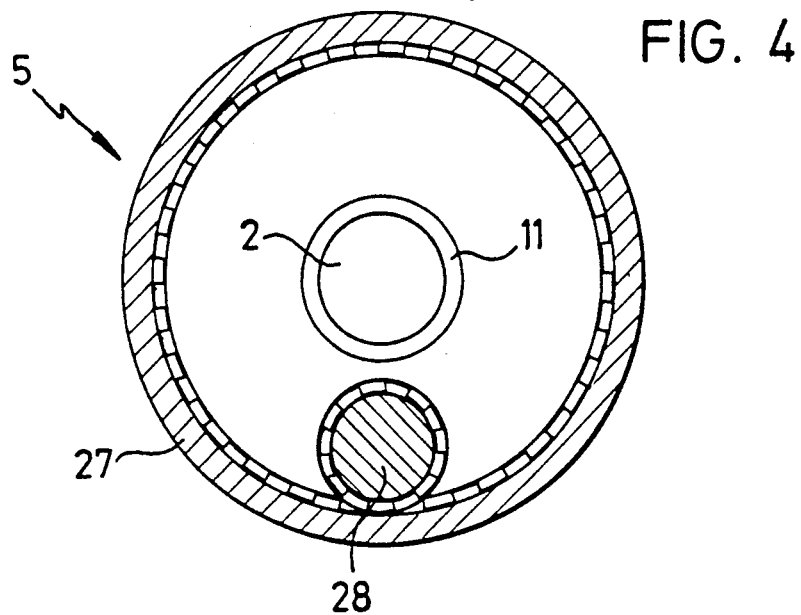
FIGS. 4 and 5 show views of a further embodiment of the reduction transmission means of the apparatus according to the invention.
Figure 5:
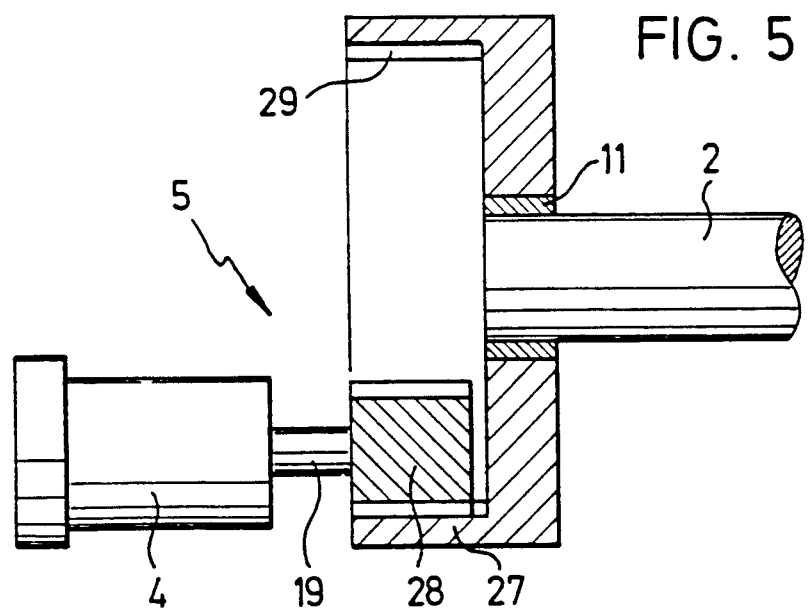

Reference will now be made to FIGS. 4 and 5 showing an embodiment of the self-locking reduction transmission means 5 in the form of a planetary transmission. The planetary transmission has an annular gear 27 which is connected to the main shaft 2 by way of the overload protection means 11 in the form of a slipping clutch. The planetary transmission also includes a planet gear 28 which meshes with the internal teeth 29 of the annular gear 27 and which is suitably connected to the shaft 19 of the drive motor 4. Because of the correspondingly reduced step-down ratio with this reduction transmission means 5, the self-locking action is brought about upon a reversal in the flow of force, that is to say when force goes from the main shaft 2 to the drive motor 4, more particularly in the situation where the clamping arrangement 3 is being operated for tightening it or loosening it, for example for fitting a rotary member to be balanced on to the main shaft 2 or removing the rotary member after unbalance measurement thereof. The self-locking reduction transmission means therefore provides that, upon the above-mentioned reversal in the flow of force from the main shaft 2 to the drive motor 4, the self-locking effect produced by the reduction transmission means affords the necessary restraining force for the main shaft for actuation of the clamping arrangement 3 for holding the rotary member 1 to be balanced on the main shaft. Thus the rotary movement applied to the main shaft 2 when operating the clamping arrangement 3 is resisted by the restraining force produced by virtue of the self-locking effect of the reduction transmission means 5, utilising the property of the transmission means that the self-locking action is guaranteed at the output side thereof. For that purpose the reduction transmission means has a suitable step-down ratio, between the speed of rotation of the drive motor and that of the main shaft, of for example 1/50 or greater. With the arrangement according to the invention, the holding force applied to the main shaft 2 by virtue of the self-locking or irreversibility action of the reduction transmission means is greater than the rotary moment or torque acting on the main shaft 2 upon actuation of the clamping arrangement 3.

It may be noted at this point that it has been found that the unbalance measuring run can be carried out at a relatively low speed of rotation of the main shaft, for example 200 revolutions per minute, so that for example a 110/220 volt single-phase network is sufficient as the power supply for the drive motor 4 which may be in the form of a servo motor with a power output of 100-200 watts. As indicated above, the drive motor may be a comutator-less dc motor or an asynchronous motor, while suitable electronic control assemblies for a comutator-less dc motor or frequency converters for asynchronous motors are commercially available with suitable control components, in the form of microprocessors.

It will be seen therefore that the provision of the self-locking or irreversible transmission means operatively disposed between the drive motor and the main shaft means that the transmission means serves not only for transmitting the drive torque from the motor to the main shaft, but it also performs operating functions in regard to decelerating, restraining and positioning the main shaft. As a result the construction of the apparatus according to the invention is of considerably simplified nature in comparison with a conventional machine, while it also involves a reduced energy requirement for powering the drive motor.

It will be appreciated that the above-described constructions have been set forth solely by way of example and illustration of the principles of the present invention and that various modifications and alterations may be made therein without thereby departing from the spirit and scope of the invention.

I claim:

1. An apparatus for measuring unbalance on a rotary member comprising:
   a main shaft for carrying a rotary member to be balanced;
   clamping means for clamping said rotary member on said main shaft, an actuation of said clamping means applying a torque to said main shaft;
   a motor for driving said main shaft at a measuring speed of rotation;
   reduction transmission means operatively disposed between said main shaft and said motor for applying a restraining torque to said main shaft in the absence of power to said motor, the restraining torque which is applied to said main shaft by a restraining effect of the reduction transmission means being greater than said torque applied to said main shaft by actuation of said clamping means; and
   a torque monitoring circuit means for detecting a torque applied to said main shaft and for turning on said motor to overcome said restraining effect of said reduction transmission means when a torque is being applied to said main shaft by actuation of said clamping means.

2. An apparatus as in claim 1, further comprising a switch means for switching said torque monitoring circuit means on and off.

3. An apparatus as in claim 1, wherein said torque monitoring circuit means comprises first and second sensors arranged at respective sides of said main shaft, a difference forming means for actuating said motor, the difference forming means being connected to outputs of the first and second sensors.

4. An apparatus as in claim 3, wherein said first and second sensors comprise unbalance measurement pickup means.

5. An apparatus as in claim 4, wherein said first and second sensors are arranged in a measuring plane of a measuring assembly for measuring dynamic unbalance of said rotary member.

6. An apparatus as in claim 1, wherein said reduction transmission means provides about 1:50 gear reduction between said motor and said main shaft.

7. An apparatus as in claim 1, further comprising an overload protection means operatively disposed between said motor and said main shaft, for limiting rotary power transmitted therebetween.

8. An apparatus as in claim 7, wherein said overload protection means is operatively disposed between said reduction transmission means and said main shaft.

9. An apparatus as in claim 7, wherein said overload protection means comprises a coupling means.

10. An apparatus as in claim 1, wherein said motor is a servo motor with a power of 100–200 watts.

11. An apparatus as in claim 1, wherein said reduction transmission means is a self-locking gear type transmission with crossed axes.

12. An apparatus as in claim 1, wherein said transmission means is a planetary transmission.

13. An apparatus for measuring unbalance on a rotary member comprising:
   a main shaft for carrying a rotary member to be balanced;
   clamping means for clamping said rotary member on said main shaft, an actuation of said clamping means applying a torque to said main shaft;
   a motor for driving said main shaft at a measuring speed of rotation;
   reduction transmission means operatively disposed between said main shaft and said motor for applying a restraining torque to said main shaft in the absence of power to said motor, the restraining torque which is applied to said main shaft by a restraining effect of the reduction transmission means being greater than said torque applied to said main shaft by actuation of said clamping means; and
   overload protection means operatively disposed between said motor and said main shaft, for limiting rotary power transmitted therebetween.

14. An apparatus as in claim 13, wherein said overload protection means is operatively disposed between said reduction transmission means and said main shaft.

15. An apparatus as in claim 13, wherein said overload protection means comprises a coupling means.

16. An apparatus as in claim 1, wherein said reduction transmission means is a helical gear type transmission.

* * * * *